United States Patent [19]
Wieg

[11] 3,816,002
[45] June 11, 1974

[54] APPARATUS FOR MEASURING DISPLACEMENT BETWEEN TWO RELATIVELY MOVABLE MEMBERS

[76] Inventor: Heinrich J. Wieg, Box 221, R. R. 3, Wilmington, Ohio 45177

[22] Filed: Oct. 10, 1972

[21] Appl. No.: 296,005

[52] U.S. Cl................ 356/169, 356/172, 33/125 C
[51] Int. Cl. ........................................... G01b 11/04
[58] Field of Search ............. 74/440; 356/169, 172; 33/125 A, 125 C, 125 R, 174 L; 287/87

[56] References Cited
UNITED STATES PATENTS

| | | | |
|---|---|---|---|
| 2,694,804 | 11/1954 | Wagner.............................. | 356/169 |
| 2,797,488 | 7/1957 | Willrich et al. .................. | 33/125 R |
| 2,886,717 | 5/1959 | Williamson et al................ | 356/170 |
| 3,403,448 | 10/1968 | Aller ................................ | 33/174 L |
| 3,579,836 | 5/1971 | Kraus................................. | 33/1 R |
| 3,586,665 | 6/1971 | Weyrauch.......................... | 356/169 |
| 3,602,205 | 8/1971 | Turkish............................. | 267/158 |
| 3,658,429 | 4/1972 | Zipin................................ | 33/125 A |

OTHER PUBLICATIONS
(Cordax Measuring System) Sheffield
(Encoders) Teledyne–Gurley, Troy, N.Y. 12181
(Incremental Digital Position Readout) Numerics Inc., 4030 Fabian Way, Palo Alto, Calif., 94303
(Linear Glass Scale Measuring System) IKL Inc., Newport Beach, Calif.
(Digiscale) Itek, Wayne George Div., Newton Mass.
(Linear Measuring System), Dynamics Research Corp., Stoneham, Mass. 02180
(Linear Encoder, Incremental Position) Baldwin Electronics Corp., 1101 McAlmont, P.O. Box 3833, Little Rock, Ark.

Primary Examiner—Ronald L. Wibert
Assistant Examiner—Paul K. Godwin
Attorney, Agent, or Firm—Eugene C. Goodale

[57] ABSTRACT

A measuring apparatus for detecting relative movement between a fixed object and a movable object is disclosed. The measuring apparatus comprises a transducer guided on a grating tape slidably mounted within a housing. The housing is connected to one of the relatively moving members. The transducer is connected to the other of the relatively moving members. A flexible ball joint provides the connection between the transducer and the other relatively moving member. Means are provided for length calibration and to compensate for expansion and contraction due to temperature fluctuations. The whole measuring system is self-contained so that the system accuracy is not dependent on relative accuracies of the carrier machine members.

13 Claims, 9 Drawing Figures

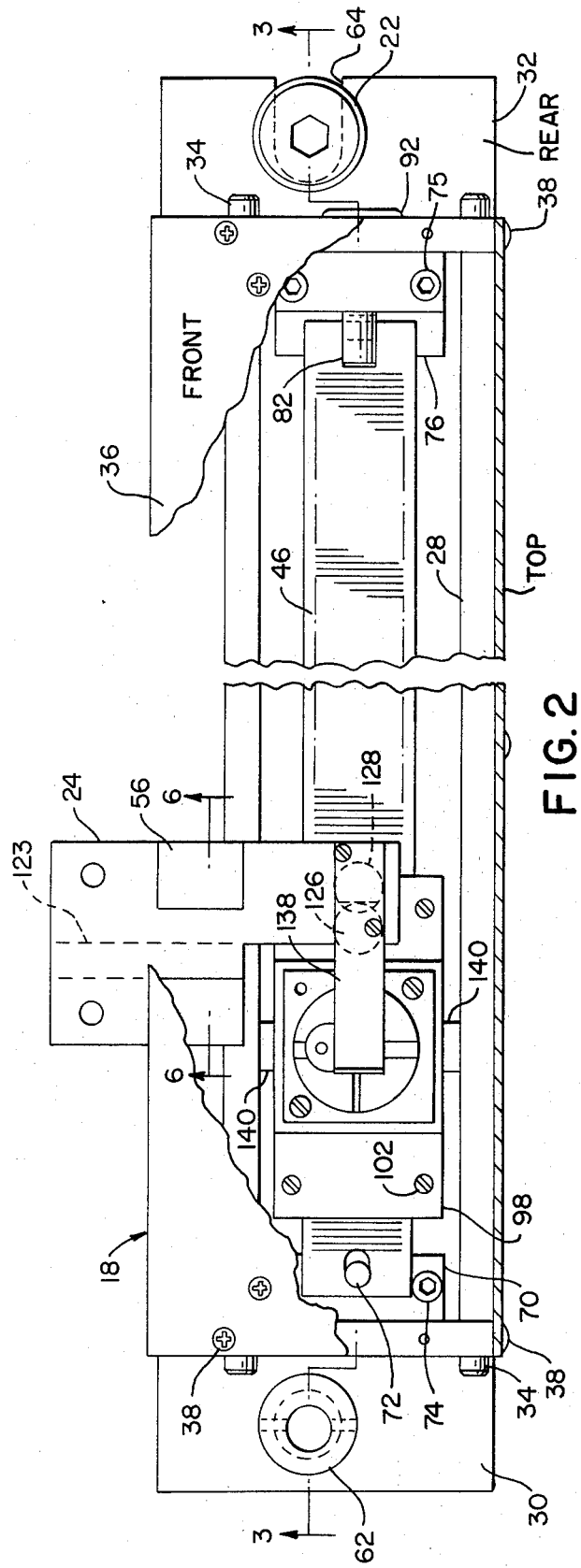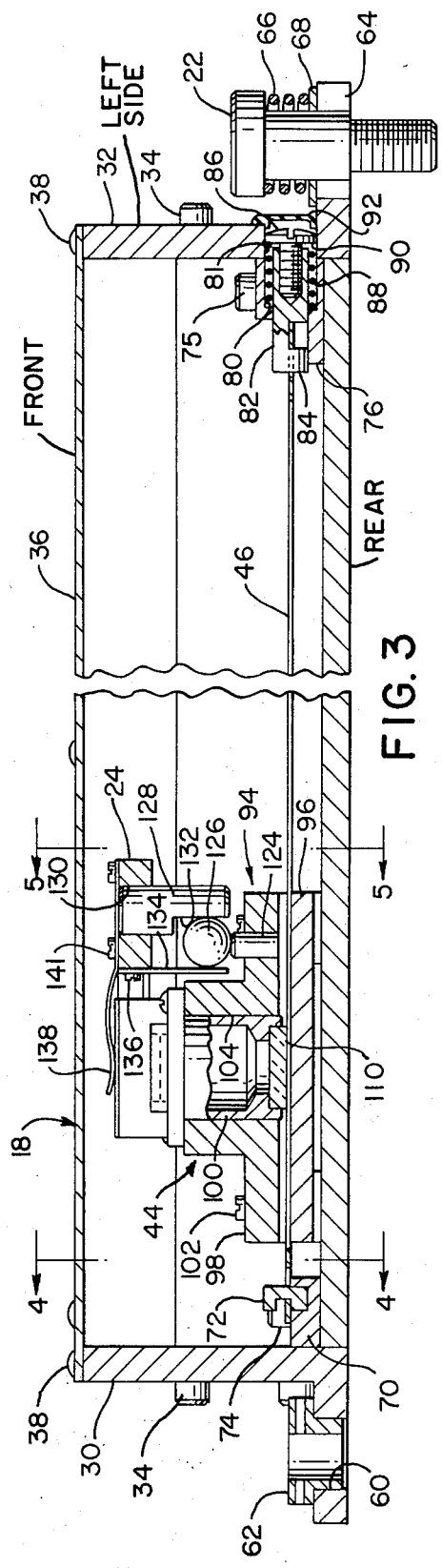
FIG. 2
FIG. 3

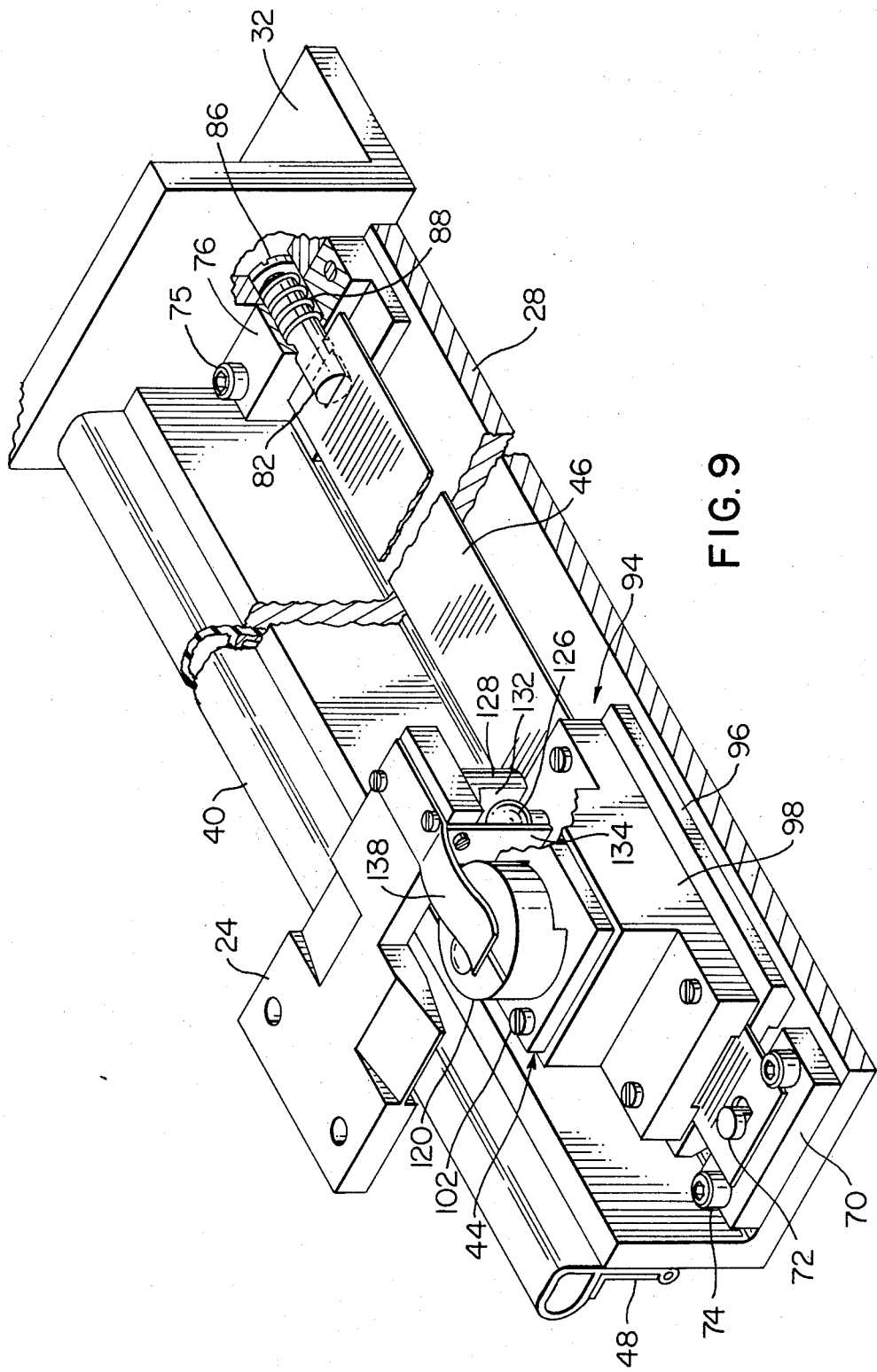

APPARATUS FOR MEASURING DISPLACEMENT BETWEEN TWO RELATIVELY MOVABLE MEMBERS

BACKGROUND OF THE INVENTION

This invention relates generally to measuring apparatus for determining the extent of the relative displacement from a reference point and more particularly to a single axis measuring apparatus for determining the extent and sense of the relative movement of a first object, such as a machine tool, in one or the other of two opposite directions along the axis with respect to a second object, such as the bed of a machine.

Precision measuring systems for identifying the position of a first movable member relative to a second member, or vice versa, are increasingly important in various applications, such as the machine tool art or measuring art, for example, in which a workpiece is to be measured with respect to a reference point. It will be appreciated that for precision machining this measurement must be made to a very high order of accuracy. It is known to effect such a measurement by arranging for an optical fringe pattern to be moved in correspondence as regards extent and sense with the movement of the object and counting the number of fringes displaced from a fiducial line. One such system which produces the optical fringe pattern required is that known as the moire fringe system in which superimposed optical gratings are ruled to produce a cyclic coincidence pattern of alternate opacities and transparencies as the gratings are moved relative one to the other. Measuring systems of this type are broadly described in Williamson et al U.S. Pat. No. 2,886,717 and Shepherd et al U.S. Pat. No. 2,886,718, both issued May 12, 1959. Aller U.S. Pat. No. 3,403,448 issued Oct. 1, 1968, described a measuring machine incorporating the moire fringe principle.

To date there has not been provided a relatively inexpensive measuring system incorporating the moire fringe principle which is readily adaptable to existing machines. In the past, it has been quite expensive to convert an existing machine, such as a drill press or the like, for moire fringe measurement. Such a conversion has previously required the milling of the machine bed or base so as to accept an optical tape or the like. This tape is fixedly secured, after requiring precise alignment, to the milled portion. The second grating and associated electronics are then mounted for sliding movement therealong. This installation is inherently costly due to the time involved and the system accuracy is dependent on the accuracy of the track of the ways. In addition, adequate provisions must be made to protect the optical tapes from being marred, etc., which adds additional cost to the conversion.

Accordingly, it is an object of this invention to provide a low cost, moire fringe high quality measuring system which is readily adaptable for addition to existing machines.

A further object of this invention is to provide a measuring apparatus having high reliability and accuracy and wherein the apparatus accuracy does not depend on the accuracy of the carrier members to which it is mounted.

Another object of this invention is to provide a single axis measuring system entirely housed within its own housing.

Another object of this invention is to provide a measuring apparatus of the moire fringe type having a substantially floating scale and means for preventing lost motion when the direction of travel is reversed.

SUMMARY OF THE INVENTION

This invention provides an improved measuring apparatus of the moire fringe type for precise measurement along a single axis. The measuring apparatus is of simple and economical construction, is easy to operate, efficient, and can be easily installed and properly aligned. The measuring apparatus comprises optical gratings secured in a self-contained and sealed housing for guided relative movement one to the other. One grating or lined tape is secured to the housing. A second grating or vernier grating is secured to the transducer head, said head being connected for movement relative to the other grating. The housing and transducer head are respectively connected to relatively moving parts of a machine or the like so as to provide movement between the two gratings. A flexible joint connection prevents a backlash when the direction of the relative motion is reversed. The flexible joint permits use of the measuring apparatus without detriment in accuracy when minor changes in relative motion of the moving members other than in the direction of measurement occur. Means are provided to compensate for the expansion and contraction of the housing and gratings due to heat fluctuation. The heat compensation means allows the use of lightweight metal frames having higher expansion modulii without impairing accuracies.

Other objects, details, uses, and advantages of this invention will become apparent as the following description of an exemplary embodiment thereof presented in the accompanying drawings proceeds.

BRIEF DESCRIPTION OF THE DRAWINGS

The accompanying drawings show a present exemplary embodiment of this invention in which:

FIG. 2 is a top view of the measuring apparatus of FIG. 1 with the housing partially cut away;

FIG. 3 is a cross-sectional view taken on the line 3—3 of FIG. 2;

FIG. 9 is an isometric drawing, partially broken away, showing the interior of the measuring apparatus of FIG. 1.

DESCRIPTION OF THE ILLUSTRATED EMBODIMENT

Figure 1:
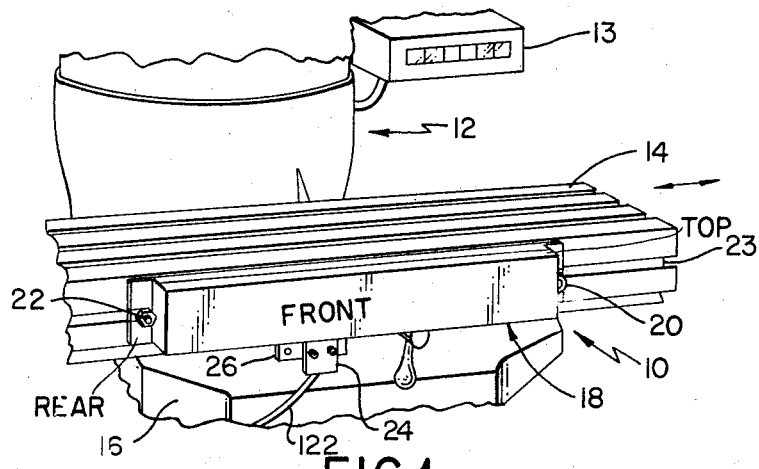
FIG. 1 is a perspective view illustrating one exemplary embodiment of this invention showing the measuring apparatus installed on a typical machine tool.

Reference if now made to FIG. 1 of the drawings, which illustrates one exemplary embodiment of the improved measuring apparatus of this invention, which is designated generally by the reference numeral 10. The measuring apparatus 10 is mounted to any suitable machine or device, such as a drill press 12. The drill press 12 has a movable work table 14 and a stationary base 16 to which respective parts of the measuring apparatus 10 are connected. A digital display or the like 13 is electrically connected with the apparatus 10 to receive signals therefrom and transform such signals in a known manner to a usable display.

The measuring apparatus housing, shown generally as 18, is secured to the work table 14 by bolts 20 and 22. The bolts 20 and 22 are provided with tapered or cylindrical members to cooperatively engage the slot or groove 23 of the work table 14 to keep the housing 18 aligned. After securing adjustment the bolts do not permit movement of the housing 18 in the vertical direction relative to the work table 14 but do allow the housing to expand and contract in the linear or axial direction as will be explained herebelow. Also, one bolt has an eccentric bushing for length adjustment. A transducer bracket 24 projects outwardly from the housing 18 and is securely attached to a bracket 26 which is secured to the base 16. It is seen that in the embodiment of FIG. 1 that the housing 18 will move relative to the transducer bracket 24. It may well be noted that the positions of the housing 18 and bracket 24 could be changed such that the housing would be stationary and the bracket 24 would be movable relative to the housing.

Figure 6:
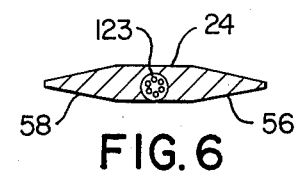
FIG. 6 is a cross-sectional view taken on the line 6—6 of FIG. 2.
Figure 4:
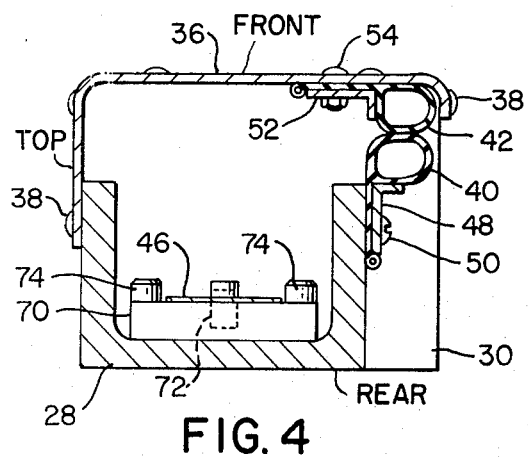
FIG. 4 is a cross-sectional view taken on the line 4—4 of FIG. 3.
Figure 7:
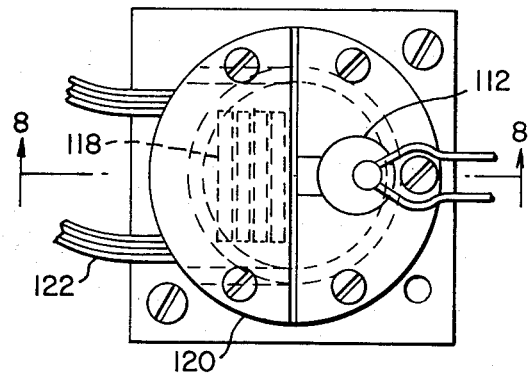
FIG. 7 is a top view of the transducer head.
Figure 5:
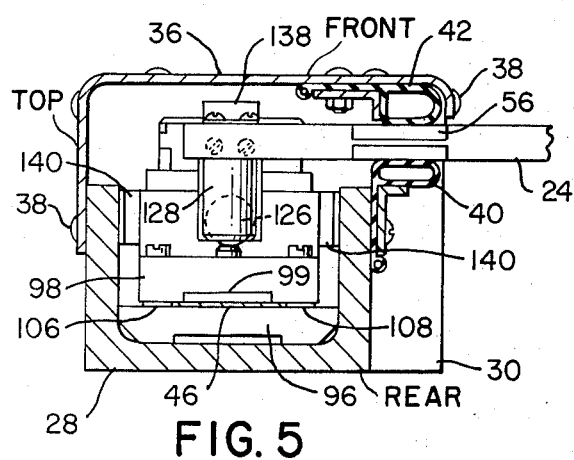
FIG. 5 is a cross-sectional view taken on the line 5—5 of FIG. 3.

Referring now to FIGS. 2-5, the housing 18 is seen in more detail. The housing is comprised of an elongated base channel 28. As seen particularly in FIGS. 4 and 5, the base channel 28 is substantially U-shaped and in this embodiment is formed as an integral member. However, the base channel 28 could as easily be fabricated from a plurality of elements. Secured to each end of the base channel 28 is a pair of end plates 30 and 32. The plates 30 and 32 are secured to the channel 28 by any suitable means such as bolts or the like 34. A cover 36 is secured by suitable means, such as screws or the like 38, to the plates 30 and 32 and base channel 28. The cover 36, together with suitable sealing strips 40 and 42, base channel 28 and end plates 30 and 32 define an enclosed area in which the transducer, generally designated as 44 (FIG. 8) and the fixed scale, grating or tape 46 are mounted for closely guided relative movement therebetween. Referring once again to FIG. 4, it is seen that the sealing strip 40 is secured to the vertical arm of the base channel 28 through the use of an angle strip 48 which is secured by screws or the like 50 to said arm. The sealing strip 42 is secured to the cover 36 by a similar angle strip 52 by any suitable means such as a nut and bolt 54. The sealing strips are formed of any suitable material such as rubber or the like. The sealing strips have sufficient rigidity to maintain an air and dirt seal, yet are sufficiently flexible to be compressed to allow passage of transducer bracket 24 as seen in FIGS. 5 and 6.

The transducer bracket 24 is formed with tapered edges 56 and 58 on either side of the bracket 24. The shape of the tapered edges 56 and 58 of the bracket 24 is such that it facilitates the opening and closing of the sealing strips 40 and 42 during relative movement between the bracket 24 and housing 18. FIG. 5 shows the sealing strips with the bracket 24 interposed therebetween. The tapered edges of the bracket 24 may be coated with any suitable lubricating material to enhance the relative sliding qualities between the bracket 24 and the sealing strips 40 and 42.

The end plate 30 is formed with an aperture 60 into which an eccentric bushing 62 is mounted. The bolt 20 (FIG. 1) extends through the bushing 62 in a tight fit. Rotation of the bushing 62 relative to the plate 30 permits limited axial and transverse movement of the plate 30 and hence the housing 18. In this way, the housing may be precisely adjusted to allow precise length calibration of the scale counting, as well as limited movement of the housing, relative to the worktable 14 which has been compensated by the spring loaded bolt 22 at the other end. When the bolt 20 is tightened down, the plate 30 is securely held in a reference position relative to the worktable 14. Adjustment of the eccentric bushing 62 will cause a slight skew of the track of the apparatus 10 relative to the direction or axis of measurement. This skewing permits calibration of the apparatus in that skewing will provide more counts per given length.

The end plate 32 is formed with a slot 64 through which the bolt 22 protrudes. A spring 66 is mounted about the bolt 22, acting against the bolt and the plate 32 through a washer or the like 68. The spring 66 applies sufficient pressure against the plate 32 to hold it secure, yet will allow the housing to expand and contract in the linear or axial direction. This arrangement permits the housing 18 to expand and contract with the temperature of the machine to which it is secured, as well as allow for calibration procedure as mentioned above.

One end of the lined tape 46 (FIGS. 2 & 3) is securedly fixed against linear movement by bracket 70 and hook or pin 72. The hook or pin 72 is fixedly mounted in a cooperating bore in the bracket 70. Lined tape of the type employed in moire fringe type measured systems is commercially available and is commonly provided with apertured ends. Thus, the apertured end may be positioned to engage the cooperating hook or pin 72 in the bracket 70. Suitable means, such as bolts or the like 74 fixedly secure the bracket 70 to the base channel 28. This provides a fixed linear end or reference position for the tape 46, yet compensates for slight height variations by permitting limited vertical and horizontal movement.

The other end of the tape 46 is yieldably attached to bracket 76. While the embodiment herein described is shown as a single member bracket, it is obvious that the bracket 76 could be formed as a two piece member. The bracket 76 is formed with an enlarged bore 80 through which a hooked or notched member 82 protrudes. The bracket 76 is fixedly secured to the base channel 28 by bolts or the like 75 so that the bore 80 is aligned with a bore 81 formed in the plate 32. Hence, one end of the member 82 protrudes into the bore 81. The notched end 84 is placed through the apertured end of the tape 46 to hold the tape in place. A screw 86 is threadably secured in the member 82. A spring 88 is mounted in the bore 80 about the member 82 and acts at one end against the end of the bore 80 and at the other end against a washer or the like 90, said washer being placed between the head of the screw 86 and the end of the member 82. The force of the spring 88 causes the member 82 to hold the tape 46 taut and compensate for a slight expansion and contraction of the housing 18 and channel 28 relative to the tape 46. The spring 88 permits calibration of the tape length by placing more or less pull on the tape 46 to make slight changes in tape length. However, even during such expansion or contraction, the tape 46 will remain taut with the same tension due to the spring force. An end cap or the like 92 is placed in the bore 81 to close the bore so as to prevent dirt and foreign matter from entering the bore.

The transducer 44 is carried for sliding movement along the base channel 28 by a transducer support carriage designated generally at 94 (FIG. 3). Referring particularly to FIGS. 3, 4 and 5, the support carriage 94 comprises a slide base 96 carried on the bottom of the base channel 28 and beneath the tape 46. A slide top 98 is placed above the tape 46 and is secured to the slide base 96 by screws or the like 102. The slide top 98 is formed with a channel 99 its entire length to avoid damaging the measuring portions or lines of tape 46. Spacers or the like 106 and 108 (FIGS. 3 and 5) are positioned between the slide top and slide base to provide a constant optical air gap which is necessary to be maintained between the fixed tape 46 and the traveling grating or vernier grating 110. The slide base 96 is formed of a material which has lubricating quality, such as Teflon or nylon or the like, to facilitate ease during relative sliding movement between the base 96 and the base channel 28.

Figure 8:
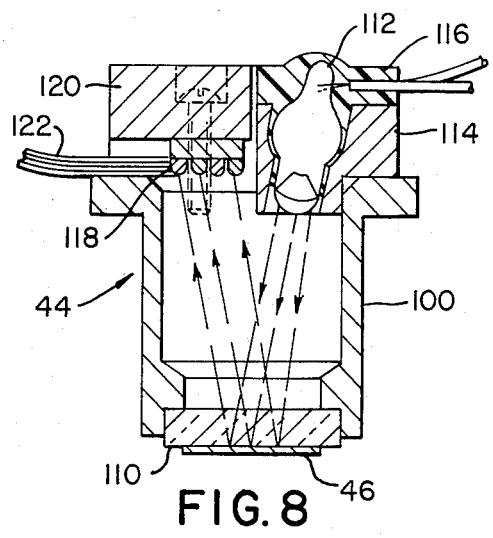
FIG. 8 is a cross-sectional view of the transducer head taken on the line 8—8 of FIG. 7.

The transducer 44, FIGS. 3 and 8, is formed with a housing 100 which is carried in a bore 104 formed in the slide top 98. Mounted above the vernier grating 110 is a suitable source of energy, such as the lens faced lamp 112. The lamp 112 is carried by a lamp holder 114 and secured therein by any suitable cover 116. A plurality of detecting elements 118 is mounted in a holder 120 and carried by the housing 100 above the vernier grating 110. When the transducer 44 is mounted to the support carriage 94, the lines of the vernier grating are positioned to be adjustably skewed relative to the lines of the fixed grating or tape 46. Thus, relative displacement in either direction of the grating 110 relative to the grating 46 will produce a cyclic wave pattern as discussed in the aforementioned Shepherd et al and Williamson et al patents. The pattern is illuminated by the lamp 112 and reflected back from the tape 46 to be picked up by the detecting elements 118. In this instance, the elements 118 are in the form of photocells and operate in a known manner. The outputs from the detecting elements 118 are applied over lines 122 to an appropriate readout or counter 13. A drilled hole or shaped groove 123 (FIGS. 2 and 6) is formed in the bracket 24 to receive the lines 122 and the power supply lines for the lamp 112. The lines are preferably embedded in any suitable material and placed in the hole or groove 123. If the groove has an open area, any suitable insulator may be placed therein to hold the lines in the bracket 24 and to prevent such lines from being frayed due to frictional engagement with the sealing strip 40.

An extension rod or post 124, FIGS. 3 and 5, is secured in a bore in the slide top 98. A ball 126 is secured to the end of the post 124 and provides a ball joint connection between the support carriage 94 and the transducer bracket 24. A shaft 128 is mounted in aperture 130 formed near the end of the bracket 24. The shaft 128 is formed with the flat surface 132 to engage ball 126. A flat ball spring 134 is secured by screws or the like 136 to the bracket 24 opposite the ball engaging surface 132 of shaft 128. The spring 134 provides a bias preload force against the ball 126 so as to keep the surface 132 in continuous engagement with the ball 126 so as to prevent any lost motion between the bracket 24 and carriage 94 during reversal of relative movement. The ball 126, surface 132 and spring 134 in effect provide a flexible ball joint between the support carriage 94 and the bracket 24 so that the ball 126 is continually engaged within a certain angular range. Thus, there can be minor transverse and vertical rotation of the bracket 24 relative to the ball 126 without affecting the accurate measuring capabilities of the apparatus 10.

A spring 138 is secured at one end by screws or the like 141 to the bracket 24. The other end of the spring 138 engages the tops 116 and 120 of the transducer 44 and urges the transducer 44, and hence the support carriage 94 into engagement with the base channel 28 to allow operation in any attitude. Guide buttons 140, formed of Teflon, nylon or the like (FIG. 5) are held, by any suitable means, at both sides of the transducer 44. The guide buttons 140 assist in assuring that proper alignment of the transducer 44 relative to the base channel 28 is maintained, thus assuring proper orientation between the vernier grating 110 and the fixed tape 46. The use of the spring 138 and the guides 140 permit installation of the measuring apparatus 10 in positions in which the base channel 28 is other than that shown in FIGS. 4 and 5. In other words, the apparatus 10 may be mounted in the side position shown in FIG. 1 or in which the relative movement is in the vertical direction.

It can be seen that the measuring apparatus of this invention provides a moire fringe measuring system in a self-contained unit which is readily adaptable for mounting and use on existing machines. Accordingly, the objectives hereinbefore set forth have been accomplished.

While a present exemplary embodiment of this invention has been illustrated and described, it will be recognized that this invention may be otherwise variously embodied and practiced by those skilled in the art.

What is claimed is:

1. In combination with a measuring apparatus for determining the extent and sense of the movement between first and second relatively moving members, the apparatus being of the general type wherein relative movement of a vernier grating and an optical grating, each having spaced lines thereon and one superimposed over the other, produce a cyclic pattern in response to the relative movement of the gratings, and wherein a transducer provides a signal in response to the cyclic pattern formed, the improvement which comprises:

an elongated housing having a channel defined therein;

an elongated optical grating mounted within said housing along the base of said channel;

means fixedly securing one end of said grating adjacent one end of said housing;

tension securing means operatively connected with said optical grating at the other end to support said optical grating in floating fashion above the channel base of said housing, said tension securing means permitting length calibration of said optical grating depending on the tension force applied thereto wherein the tension force maintains said optical grating taut whereby expansion and contraction of said housing due to temperature fluctuations do not effect the length calibration of said optical grating;

a support carriage slidably carried in said housing channel for relative movement therealong, said carriage having the transducer and vernier grating mounted thereon, said vernier grating being supported in continuous spaced relationship adjacent said elongated optical grating;

housing adjustment means adapted to mount said housing to said first relatively moving member, said adjustment means providing for limited axial and transverse movement of said housing relative to said first member wherein said housing may be precisely positioned for calibration purposes relative to the linear axis of measurement;

bracket means projecting outwardly from said housing, said bracket means adapted to secure said bracket means to said second relatively moving member;

flexible joint means operatively connecting said bracket means with said support carriage wherein relative movement between said first and second members will cause a relative movement between said housing and said carriage wherein relative movement occurs between the vernier grating and optical grating; and bias means connected to said bracket and acting against said flexible joint means to impart a preload force against said joint means thereby preventing miscounts between the vernier and optical grating when the direction of relative motion is changed.

2. The combination as set forth in claim 1 in which said adjustment means includes an eccentric bushing at one end of said housing, said housing being formed with an open ended slot at the other end; a spring biased bolt extending through said slot to secure said housing other end to said first member, said spring acting between said bolt and said housing wherein said housing will expand and contract with the temperature of said first member to which it is secured without affecting the accurate measuring capabilities of the apparatus.

3. The combination as set forth in claim 1 in which said elongate housing base channel is substantially U-shaped and includes an end plate at each end of said channel.

4. The combination as set forth in claim 3 in which said housing further comprises a cover over said base channel substantially enclosing said housing to provide a self-contained measuring apparatus, said cover terminating above one side of said base channel through which said bracket means protrudes, said housing further including resilient sealing strips along the portion of said housing not enclosed by said cover, said resilient sealing strips cooperating with each side of said bracket to maintain the interior of said housing contamination free.

5. The combination as set forth in claim 4 in which said support carriage comprises a slide base engaging the bottom of said base channel for relative sliding movement therealong beneath the optical grating, a slide top mounted above said slide base, said slide base and slide top defining a channel therealong through which said optical grating passes.

6. The combination as set forth in claim 5 further comprising guide elements cooperating between said base channel and said support carriage for precisely positioning the vernier grating and transducer relative to said optical grating and further comprising a hold down spring secured at one end to said bracket means, the other end of said spring acting against said carriage to urge said carriage to the bottom of said base channel for travel therealong.

7. In combination with a measuring apparatus for determining the extent and sense of the movement between first and second relatively moving members, the apparatus being of the general type wherein relative movement of a vernier grating and an optical grating, each having spaced lines thereon and one superimposed over the other, produce a cyclic pattern in response to the relative movement of the gratings, and wherein a transducer provides a signal in response to the cyclic pattern formed, the improvement which comprises:

a housing, said housing including
  an elongated base channel having a bottom section connected with wall sections,
  an end plate at each end of said base channel, said end plates and base channel defining a substantially U-shaped track, a cover over said base channel substantially enclosing said base channel,
  said cover terminating above one wall of said base channel;

means adapted to secure said housing to said first member;

an elongated optical grating mounted adjacent the bottom of said base channel;

means securing one end of said optical grating in a relatively fixed position positioned above said base channel;

yieldable means securing the other end of said optical grating at the other end of and positioned above said base channel;

a support carriage mounted in said base channel for relative movement therealong, said carriage having the transducer and vernier grating mounted thereon, said vernier grating being supported in continuous spaced relationship with said elongated optical grating, said carriage including
  a slide base engaging the bottom of said base channel for relative sliding movement therealong,
  a slide top mounted above said slide base, said slide base and slide top defining a channel therealong through which said optical grating passes;

a bracket adapted to operatively connect said carriage to said second member wherein movement of said first member relative to said second member causes a relative movement between said housing and said carriage; and flexible joint means connecting said carriage with said bracket to prevent backlash when the direction of the relative motion is reversed.

8. The combination as set forth in claim 7 further comprising adjustment means connected with said yieldable means to permit linear calibration of said optical grating.

9. The combination as set forth in claim 8 in which said house securing means comprises a first bolt passing through one end plate for engagement with said first member, to which said housing is being secured, an eccentric bushing cooperating with said end plate and first bolt for providing limited adjustment movement of said housing relative to said first member, and the other end plate being formed with an open-ended slot, a second bolt passing therethrough and engageable with said first member, a spring cooperating between said end plate and said second bolt to permit limited expansion and contraction of said housing with the temperature of said first member without affecting the accurate measuring capabilities of the apparatus.

10. The combination as set forth in claim 9 further comprising guide elements cooperating between said base channel and said support carriage for precisely positioning said support carriage for linear movement therealong, and a spring connected with said bracket and engaging said support carriage to bias said carriage to the bottom of said base channel.

11. The combination as set forth in claim 10 further comprising sealing strips along the portion of said housing not enclosed by said cover thereby providing a self-contained measuring apparatus, said sealing strips cooperating with said bracket during passage therealong to maintain the interior of said housing substantially contamination free.

12. The combination as set forth in claim 7 in which said flexible joint means includes a ball member carried by and attached to said support carriage, a shaft having a flat ball engaging surface being mounted in said bracket for cooperative engagement with said carriage carried ball, a bias spring secured to said bracket and providing a bias force against said ball to keep the ball engaging surface of said shaft in continuous engagement with said ball to prevent any lost motion between said bracket and carriage during reversal of relative movement.

13. The combination as set forth in claim 7 further comprising spacers positioned between said slide top and slide base to provide a constant optical air gap between said fixed optical grating and said vernier grating.

* * * * *